(12) United States Patent
Niclass

(10) Patent No.: US 8,355,117 B2
(45) Date of Patent: Jan. 15, 2013

(54) METHOD AND ARRANGEMENT FOR MEASURING THE DISTANCE TO AN OBJECT

(75) Inventor: Cristiano Niclass, Clarens (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 37 days.

(21) Appl. No.: 11/641,965

(22) Filed: Dec. 20, 2006

(65) Prior Publication Data

US 2007/0182949 A1 Aug. 9, 2007

Related U.S. Application Data

(60) Provisional application No. 60/752,027, filed on Dec. 21, 2005.

(51) Int. Cl.
*G01C 3/08* (2006.01)

(52) U.S. Cl. ........ 356/4.01; 356/3.01; 356/3.1; 356/4.1; 356/5.01

(58) Field of Classification Search ........... 356/3.01–66, 356/3.01–3.15, 4.01–4.1, 5.01–5.15, 6–22, 356/28, 28.5, 139.01–139.1
See application file for complete search history.

(56) References Cited

U.S. PATENT DOCUMENTS

| | | | | |
|---|---|---|---|---|
| 5,202,742 | A * | 4/1993 | Frank et al. ..................... 356/5.1 |
| 5,212,386 | A * | 5/1993 | Gratton et al. ............. 250/458.1 |
| 5,892,575 | A * | 4/1999 | Marino ......................... 356/5.01 |
| 6,414,746 | B1 * | 7/2002 | Stettner et al. ............... 356/4.01 |
| 6,515,740 | B2 | 2/2003 | Bamji et al. |
| 6,825,455 | B1 | 11/2004 | Schwarte |
| 2002/0036765 | A1 * | 3/2002 | McCaffrey et al. .......... 356/5.08 |
| 2002/0048012 | A1 * | 4/2002 | Stann ............................ 356/5.09 |
| 2002/0084430 | A1 | 7/2002 | Bamji et al. |
| 2004/0008394 | A1 | 1/2004 | Lange et al. |
| 2004/0135992 | A1 * | 7/2004 | Munro ......................... 356/4.01 |
| 2006/0109450 | A1 * | 5/2006 | Liu ............................... 356/4.03 |
| 2006/0192086 | A1 * | 8/2006 | Niclass et al. ............. 250/214.1 |

OTHER PUBLICATIONS

Shinichi Yoshimura et al., International Solid State Circuits Conference, article, "CMOS Image Sensors with Embedded Processors", Session 6, Section 6.4 A 48k frame/s CMOS Image Sensor for Real-time 3-D Sensing and Motion Detection, © 2001, 3 pages.

Ralf Jeremias et al., International Solid State Circuits Conference, article, "Integrated Mems and Display Drivers", Session 16, Section 16.5 A CMOS Photosensor Array of 3D Imaging Using Pulsed Laser, © 2001, pp. 252-253, 452-453.

Cristiano Niclass et al., "A CMOS 3D Camera with Millimetric Depth Resolution", Swiss Federal Institute of Technology, IEEE Custom Integrated Circuits Conference. pp. 705-708, Oct. 2004.

(Continued)

*Primary Examiner* — Luke Ratcliffe
(74) *Attorney, Agent, or Firm* — Blank Rome LLP

(57) ABSTRACT

Arrangement (10) for measuring the distance to an object, comprising:
a photonic source for illuminating said object using a continuous modulated photonic wave,
a solid-state image sensor, comprising an array of avalanche photodiodes and a plurality of circuits for processing signals output by said avalanche photodiodes to yield data depending on the photonic wave reflected by said object onto said photodiodes.

The circuit may comprise a multiplexer at the pixel level arranged so as to accumulate the signal output by the avalanche photodiode during different sub-periods in different storage devices.

35 Claims, 8 Drawing Sheets

OTHER PUBLICATIONS

Brian F. Aull et al., "Geiger-Mode Avalanche Photodiodes for Three-Dimensional Imaging", Lincoln Laboratory Journal, vol. 13, No. 2, 2002, pp. 335-350.

Robert Lange et al., "Time-of-flight Range Imaging With a Custom Solid-state Image Sensor". Laser Metrology and Inspection, vol. 3823, 1999, 12 pages.

Robert Lange, "3D Time-of-flight Distance Measurement with custom solid-state image sensors in CMOS/CCD-Technology", Department of Electrical Engineering, University of Siegen, 2000, 206 pages.

* cited by examiner

METHOD AND ARRANGEMENT FOR MEASURING THE DISTANCE TO AN OBJECT

REFERENCE DATA

This application claims priority of U.S. provisional patent application No. US60/752027 filed on Dec. 21, 2005, the contents whereof are hereby incorporated.

FIELD OF THE INVENTION

The present invention concerns the field of integrated circuits. In particular, it concerns a new technique for a solid-state image sensor based on avalanche photodiodes that measures the distance of objects in addition to their intensity image.

DESCRIPTION OF RELATED ART

Systems based on solid-state electronic circuits that measure the distance from a reference to an object are known in the art. Examples of such systems not based on stereoscopy and interferometry use can be divided into two main principles: triangulation and time-of-flight (TOF). Systems based on triangulation evaluate depth by illuminating a tiny spot of the scene with a laser ray. The distance of that spot to the sensor is determined by the known angle of incidence of the reflected light.

For example, S. Yoshimura, T. Sugiyama, K. Yonemoto, K. Ueda, "A 48kframe/s CMOS Image Sensor for Real-Time 3-D Sensing and Motion Estimation", Proc. ISSCC, pp. 94-95, February 2001 describes a technique based on the triangulation technique using a standard CMOS image sensor for measuring distances. The triangulation techniques require mechanical scanning of the scene at least in one direction, thus involving highly tuned precision moving parts.

Alternatively, two TOF methods are currently available: continuous modulation or pulsed based methods. Continuous modulation based TOF rangefinders measure the phase difference between a modulated light source and the wave reflected by an object. The distance between the image sensor and the object is directly proportional to measured phase difference. For these imagers, megahertz modulation frequencies, in conjunction with homodyne phase discrimination and averaging at the pixel level, have been successfully used to relax circuit specifications.

For example, utility patent U.S. Pat. No. 6,825,455 (Schwarte), R. Lange, "3D Time-of-Flight Distance Measurement with Custom Solid-State Image Sensors in CMOS/CCD-Technology", Ph.D. Thesis, ETH-Zürich, 2000, and utility patent US-A1-2004/008394 (Lange and Seitz) describe solid-state rangefinders based on a continuous light modulation. However, in those documents, the phase discrimination circuit is based on the charge couple device (CCD) principle. Since the charge carrier transport mechanism of most CCDs and photogates is based on a thermal diffusion process rather than on a drift effect, the maximum achievable demodulation frequency is severely limited. The maximal acceptable frequency reported was 20 MHz, thus preventing the rangefinder from reaching millimeter accuracy. In addition, on this type of image sensor, the CCD gates of all pixels have to be clocked at a frequency of at least two times higher than the demodulation frequency. Since CCD gates are essentially metal-oxide-semiconductor (MOS) or semiconductor-oxide-semiconductor (SOS) capacitors, this type of image sensor dissipates a large amount of power, thus preventing them to be used in battery-powered systems. The requirement of an external companion chip is an additional drawback in standard CCD fabrication technology.

Utility patent U.S. Pat. No. 6,515,740 (C. Bamji and E. Charbon, "Methods for CMOS-Compatible Three-Dimensional Image Sensing Using Quantum Efficiency Modulation", proposes a technique of homodyne phase discrimination based on a periodical modulation of the quantum efficiency of two or more photodiodes. The advantage of this technique is the use of standard complementary metal oxide semiconductor (CMOS) technology, which allows a system-on-a-chip integration, thus reducing fabrication costs. Nevertheless, since conventional photodiodes fabricated in a standard CMOS process are inferior to CCD photodiodes in terms of sensitivity and noise, this technique may require more powerful illumination source for the same depth of accuracy, or limits the signal to noise ratio (SNR) for a given illumination power budget, if compared to the technique of the above references relating to CCD. Beside, most of the above drawbacks of CCD technologies still persist.

Time-of-flight (TOF) pulsed based systems for measuring the distance from a circuit to an object use a measure the round-trip time of a single burst of light. The main advantage of these methods over modulated type TOF is that a range of operation of a few meters to several kilometers can be achieved. In order to achieve millimeter accuracies, pulsed type TOF rangefinders must have picosecond time discrimination capability. For example, R. Jeremias, W. Brockherde, C. Doemens, B. Hosticka, L. Listl, P. Mengel, "A CMOS Photosensor Array for 3D Imaging Using Pulsed LASER", Proc. IEEE ISSCC, pp. 252-253, February 2001, describes a technique based on a pulsed illumination with a standard CMOS image sensor. The method consists of sending a relatively long pulse (tens of nanoseconds) and synchronously integrating the signal reflected by objects. Since the integration phase starts at the moment the light pulse is sent, the amount of light integrated for a single pulse depends on the object distance. A very powerful laser source, which amounts to several of tens of watts, is required for the illumination. This illumination power prevents the use of such rangefinder when user's eye safety operation is strictly compulsory. In addition, the generation of such high power and precise light pulse could potentially increase the overall cost of such system.

Other TOF systems are described by B. F. Aull et al., "Geiger-Mode Avalanche Photodiodes for Three Dimensional Imaging", Lincoln Laboratory Journal, Vol. 12, No. 2, 2002, pp. 335-350, and by C. Niclass, A. Rochas, P. A. Besse, E. Charbon, "A CMOS 3D Camera with Millimetric Depth Resolution", IEEE Custom Integrated Circuits Conference, pp. 705-708, October 2004. Both documents are related to techniques using an array of single photon avalanche diodes combined with a pulsed laser source. The method consists of illuminating the scene with very short pulses (few hundreds of picosecond), then measuring the direct time-of-flight of each pulse with a time-to-digital converter. The first reference (B. F. Aull et al.) requires a custom fabrication process and a special packaging with a companion chip for integrating the accurate time discriminators on chip. The second reference (C. Niclass et al.) describes an array of single photon avalanche diodes (SPAD) operating in Geiger mode and integrated in a CMOS technology, thus allowing the integration of time-to-digital converters on a single chip. This solid-state sensor presents millimeter resolution over a distance of few meters using a very low power illumination source. Nevertheless, both techniques require very fast laser diodes (DL) to generate pulses with sub-nanosecond duration. In addition, in order to suppress the background illumination, a very narrow optical band-pass filter ought to be used. These requirements on special optical elements can potentially increase the overall cost of systems based on this principle, thus potentially preventing them to be used in high-volume applications.

SUMMARY OF THE INVENTION

There is therefore a need for solid-state electronic circuits that measure the distance from a reference to an object that avoid the drawback of the circuits of the prior art.

More generally, there is therefore a need for solid-state electronic circuits that measure the phase and/or amplitude of a received photonic wave.

In particular, there is a need for a circuit that could be integrated on a single chip, preferably in CMOS technology, use low cost components, including low cost light sources, and allows for a high resolution.

There is also a need for a corresponding method for measuring the distance from a reference to an object.

One of the aims of the present invention is also to propose pixel circuits and a sensor architecture used to precisely demodulate the incoming signal arriving on an image sensor chip.

According to the invention, those aims are fulfilled with an arrangement for measuring the distance to an object, comprising:
- a photonic source for illuminating said object using a modulated photonic wave,
- a solid-state image sensor, comprising a zero, one or two dimensional array of avalanche photodiodes and a plurality of circuits for processing signals output by said avalanche photodiodes to yield data depending on the photonic wave reflected by said object onto said photodiodes.

According to another aspect, the invention consists in the use of avalanche photodiodes and demodulation circuits, preferably at pixel level, that enable the fabrication of high performance scannerless and solid-state rangefinders using a periodically modulated illumination without the need of any time-to-digital or time-to-amplitude converter.

In the context of the patent application, the expression "continuous modulated" generally refers to any signal whose value is varying and continuously defined during the considered time interval, i.e. signals which are neither constant nor comprising Dirac pulses. Examples of continuous modulated signals include sinusoidal waves, square waves etc.

In the context of the patent application, the expression "photonic wave" and the term "light" generally refer to any electromagnetic wave in the visible light, infrared and/or ultra-violet range.

In the context of the patent application, the term "multiplexer" refers to an electrical or opto-electronic switch with selection inputs controllable by either electrical or photonic signals.

In the context of the patent application, the term "array" designates any arrangement of elements in H rows and W columns, with H and W being integers greater or equal than 1. A single element, for instance a single LED or a single photodiode, is considered as an array with 1×1 element. The length of the different rows/columns and the distance between the rows/columns may be uneven.

Continuous modulation offers the advantage of using off-the-shelf and therefore low-cost components in the illumination sub-system. Compared to pulsed methods, a larger variety of light sources is available for this mode of operation as extremely fast rise and fall times are not required. An example of low-cost optical sources that can be used in the continuous modulation method is an array of light emitting diodes (LEDs).

In a preferred embodiment of the continuous modulation method, the phase difference between sent and reflected optical beam is measured, rather than directly measuring the round-trip time of a light beam pulse. As the modulation frequency is known, the phase measurement directly corresponds to the time of flight, the quantity of interest for range imaging. Based on this principle, the use of a single modulation frequency is known as homodyne modulation/demodulation technique.

In the proposed rangefinding technique the light reflected by an object in the scene is modulated in intensity and phase, where the phase modulation is caused by the object three-dimensional (3D) information. One can retrieve the signal amplitude, offset and phase by synchronously demodulating the incoming modulated light within each pixel of the image sensor.

Demodulation of a reflected signal can be performed by synchronously sampling the signal at many different points within the modulated signal period. Since a perfect sampling method requires an infinite bandwidth, a practical method consists of (a) dividing the period of the modulated signal in several fractions and (b) accumulating the photocharges during each fraction independently over a very large number of modulation period cycles. The number of fractions (ND) within the modulation signal period should be carefully chosen since each fraction requires an independent storage device. For a practical implementation, an interesting ND is 4. If the accumulated values obtained from each fraction of the period is $\{Ci\}$ where i can be 0, 1, 2 and 3 and corresponds to the order of each fraction of the period within a modulation cycle, then the demodulated phase PHI, the amplitude A and the offset B can be found respectively by $$PHI = \mathrm{ArcTan}\left(\frac{C0 - C2}{C1 - C3}\right), \qquad \text{Equation 1}$$

$$A = \frac{\gamma}{TD \cdot \mathrm{Sin}(\gamma)} \frac{\sqrt{(C3 - C1)^2 + (C0 - C2)^2}}{2}, \qquad \text{Equation 2}$$

$$B = F(C0 + C1 + C2 + C3), \qquad \text{Equation 3}$$

where F is the modulation frequency, $$TD = \frac{1}{ND \cdot F} \text{ and,} \qquad \text{Equation 4}$$

$$\gamma = \pi \cdot TD \cdot F. \qquad \text{Equation 5}$$

TD is the duration of the fraction of the period, and the factor $\gamma/[TD \cdot \mathrm{Sin}(\gamma)]$ can be understood as amplitude measurement efficiency, practically below 1 due to the limited bandwidth used in the measurement of each value Ci. PHI gives a direct measurement of the object distance Z by $$Z = \frac{c \cdot PHI}{2(2\pi \cdot F)} + Z_{OFFSET}, \qquad \text{Equation 6}$$

where c is the speed of light and $Z_{OFFSET}$ is an distance offset that can be removed by calibration.

In addition, the quantities A and B can also be very useful. The amplitude A holds the information regarding the level of accuracy for a given measurement of Z. For instance, if the storage devices used to hold the values {Ci} start saturating, A is decreased for that particular measurement. This information can be used in the system level to decide whether it can rely on that particular measurement or, otherwise, discard it, or whether a particular avalanche photodiode should be deactivated. The signal offset B can be used as an intensity measurement for each point of the object in addition to the distance measurement, thus enabling the generation of an intensity image of the object based on the same measurement data.

In order to optimize the number of photocharges contained on each Ci measurement, one could optionally increase TD by combining two or more successive fractions of period as long as TD is shorter than the modulation period. By doing so, the fractions of period, respectively corresponding to the {Ci} values, would still be phase shifted to each other by 90 degrees. If CD is the number of original fractions of period (TD) combined together for measuring each Ci, than the new TD' would be given by a more general expression:

$$TD' = CD \cdot TD = \frac{CD}{ND \cdot F}. \qquad \text{Equation 7}$$

Equations 1, 3, and 6 remain unchanged and TD should be replaced by TD' in equations 2 and 5.

BRIEF DESCRIPTION OF THE DRAWINGS

The invention will be better understood with the aid of the description of an embodiment given by way of example and illustrated by the figures, in which.

DESCRIPTION OF A PREFERRED EMBODIMENT OF THE INVENTION

The present invention proposes a realization method of a solid-state rangefinder imager sensor comprising avalanche photodiodes (APD), and a continuous-modulated illumination scheme.

Figure 1:
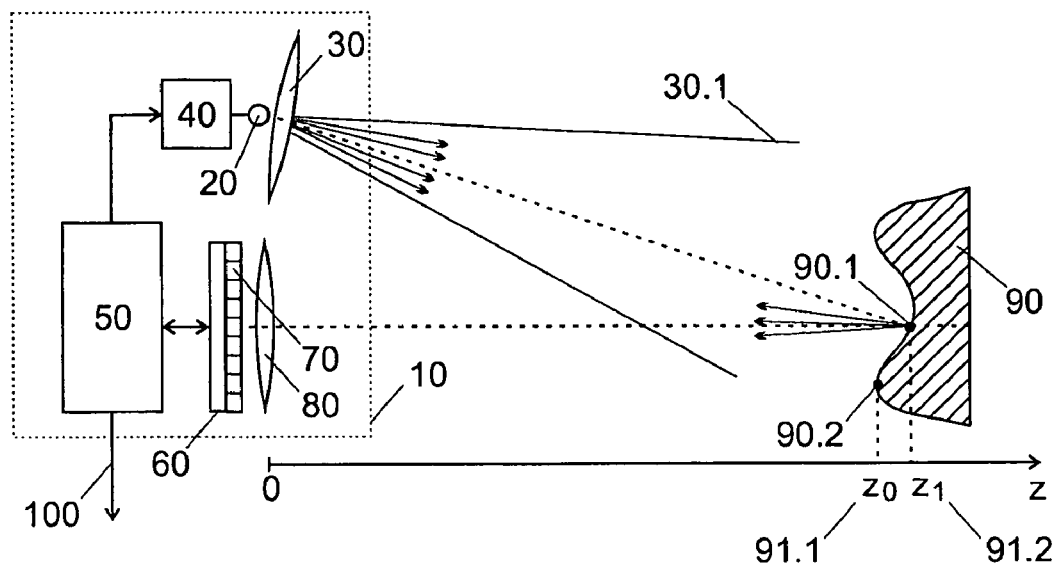
FIG. 1 illustrates a rangefinder system.

FIG. 1 illustrates an example of realization of an arrangement according to the present invention. The arrangement 10 includes a light source 20, light source optics 30 used to create a cone of light 30.1, a light source driver 40, a controller 50, a solid-state image sensor 60 comprising an array of pixels 70 based on avalanche photodiodes and an imaging lens 80. The light source 20, based for example on an array of LEDs or DLs, emits a periodic continuous modulated optical signal with frequency F and duty cycle close to 50%. The light source optics, usually an optical diffuser and/or a lens, creates a cone of light 30.1 that illuminates an object 90 in the scene. Different points of the object, such as 90.1 and 90.2, are imaged on different pixels on the imager sensor 60 by means of an imaging lens 80. The distance between the rangefinder and the points of the objects, e.g. 91.1 and 91.2, are computed within the arrangement 10 and are read out by means of an output 100.

The avalanche photodiodes in the sensor are preferably fabricated using at least two semiconductor p-n junctions. The active p-n junction, for instance the one closest to the illuminated semiconductor surface, is reverse biased to forms the avalanche multiplication region. A collecting p-n junction, for instance one of the remaining p-n junctions, collects all the charge carriers generated by the absorption of the reflected photonic wave in the semiconductor bulk, beyond the collecting p-n junction, so that the timing precision of the signal of the avalanche photodiode is not deteriorated by the diffusion time of the charge carriers generated beyond the collecting junction.

The avalanche photodiode may coexist with low voltage transistors on a same integrated circuit. In this case the collecting p-n junction allows the isolation of the avalanche photodiode so that one of its nodes can be biased to a relatively high voltage keeping the other node of the avalanche photodiode within a voltage level compatible with the low voltage transistors.

The avalanche photodiodes thus preferably operate in so-called Geiger mode, although a functioning in linear mode is not excluded. The pixel circuit preferably comprises at least a quenching circuit used to lower the reverse bias voltage to quench the avalanche current, and preferably at least a recharge circuit that is used to increase the reverse bias voltage above the photodiode breakdown voltage such that it recovers its detection ability after a quenching phase, in an embodiment, the quenching circuit operates passively by means of a resistive electrical path consisting of at least one resistor and/or at least one transistor. Alternatively, the quenching circuit could operate in active quenching by dynamically lowering the reverse bias voltage of the avalanche photodiode by means of active devices such as metal-oxide-semiconductor (MOS) transistors.

The recharge circuit operates in passive recharge by increasing the reverse bias by means of resistive electrical path consisting of at least one resistor and/or at least one transistor. Alternatively, the recharge circuit could operate in active recharge by dynamically increasing the reverse bias voltage by means of active devices such as metal-oxide-semiconductor transistors.

Figure 2:
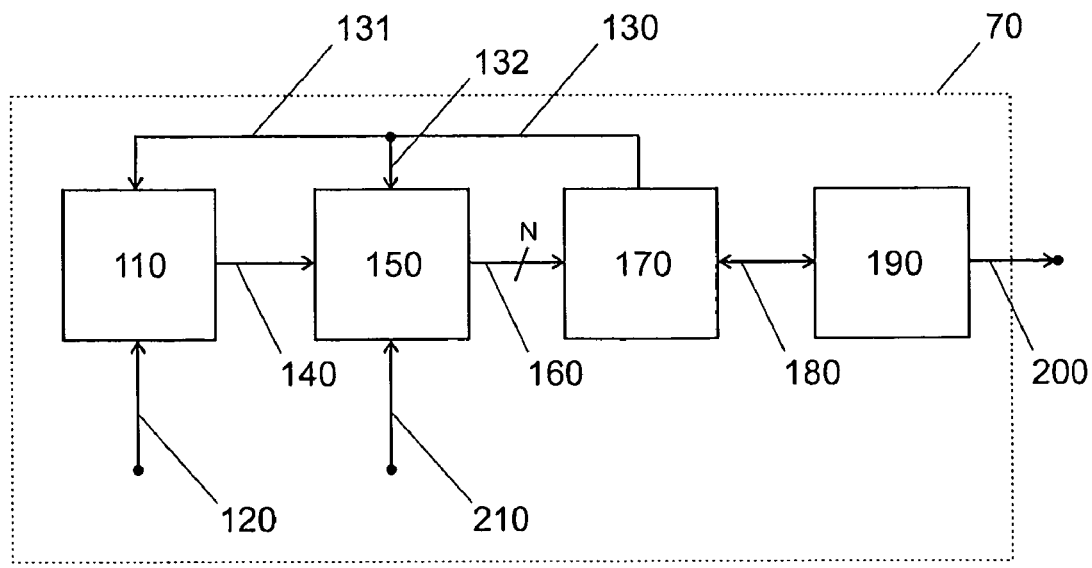
FIG. 2 illustrates pixel building blocks.

According to the present invention, the demodulation principle is processed in the pixel level by (a) dividing the period of the modulated signal in ND fractions of period and (b) counting independently the number of photons falling on an APD during each fraction of period over a very large number of modulation period cycles. FIG. 2 presents a schematic diagram of the general pixel circuitry. The pixel consists of four building blocks: an APD circuit 110, a multiplexer 150, an optional storage device 170 and a readout circuit 190.

The APD circuit outputs a signal 140 that is connected to the common input of the multiplexer. The signal 140 can be either digital when the APD operates in Geiger mode or analogue when it operates in linear mode. In a preferred embodiment, the APD operates in Geiger mode enabling single photon detection and high time discrimination capability. The APD circuit 110 can be held in an inactive mode either by the storage device via 131 when its capacity is reached or by a global line 120 driven by the image sensor controller 50.

The multiplexer circuit 150 is used to demodulate the optical reflected signal. The multiplexer could possibly be implemented by means of any kind of analogue or digital switches and/or logic gates based either on n-channel MOS, on p-channel MOS, on both n-channel MOS and p-channel MOS transistors, on NPN bipolar transistors, on PNP bipolar transistors, or more generally, on any kind of electrical or optoelectronic device.

Figure 3:
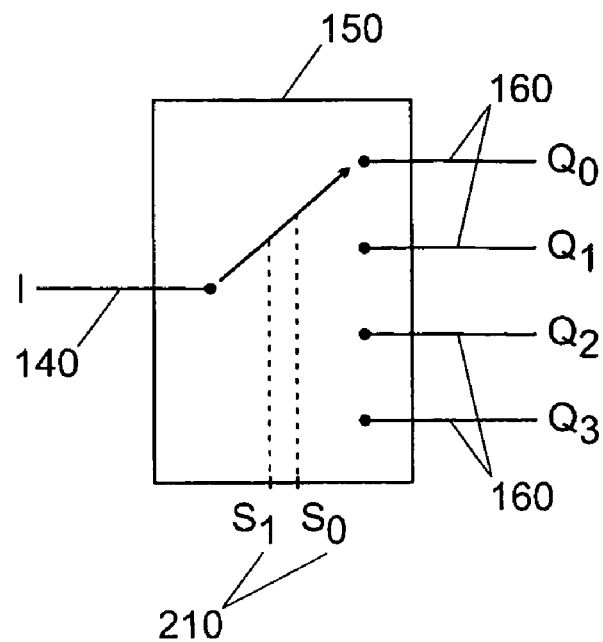
FIG. 3 illustrates a multiplexer principle.
Figure 4:
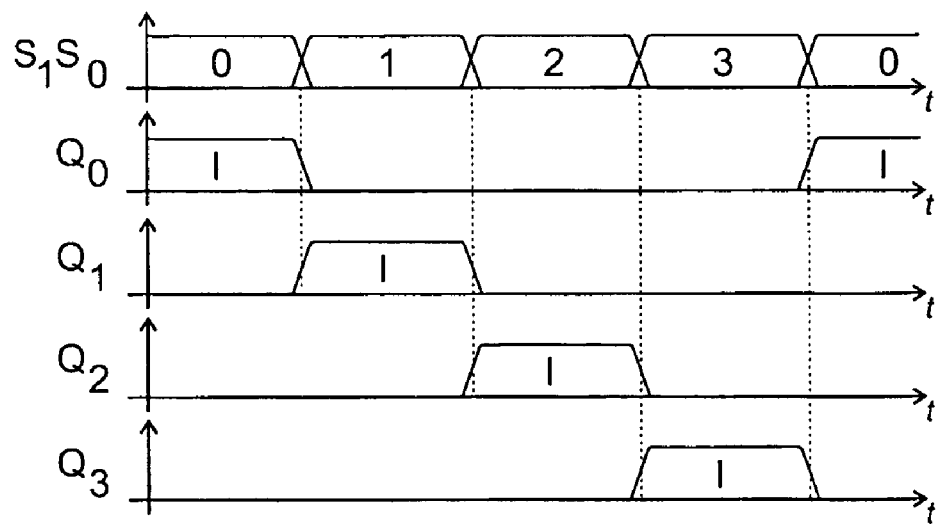
FIG. 4 illustrates a multiplexer waveform.

FIG. 3 depicts the multiplexer principle wherein the number of period fractions N is 4. The input of the multiplexer 140 is exclusively connected to each output 160 depending on the value of its selection signals 210. The remaining output connections remain in an inactive state when they are not selected by 210. Depending on the implementation of the APD circuit or storage device, this inactive state can be a logic zero, a logic one, a low voltage level, a high voltage level or a zero current state. FIG. 4 shows an example of the waveforms of the selection signals S1, S0 210 and output signals Q0, Q1, Q2, Q3 160 of FIG. 3 as a function of the time t. When an output address is selected by 210, it reproduces the input value 140 of the multiplexer. The demodulation principle is achieved by dividing the light source modulation period in N fractions of period, and synchronously driving the selection signal of the multiplexer 210 such that each multiplexer output is connected to the input during at least one fraction of period per modulation cycle.

The storage device 170 of FIG. 2 possesses N storage devices and N input signals 160. An additional output signal 130 can be optionally used as a feedback signal to indicate that the maximum storage capacity has been reached. This feedback signal can be used either by the APD circuit 110 via 131 and/or by the multiplexer circuit 150 via 132 so that all the input signals 160 of the storage device remain inactive when at least one of the storage devices has reached its maximum storage capacity. The same feedback signal can be optionally transmitted to the pixel readout circuit 190 via an interface 180 so that it requests, in turn, an asynchronous or synchronous readout operation to the system controller 50.

The pixel readout circuit 190 of FIG. 2 is connected to the storage device 170 via a digital or analogue interface 180 and it is used to transmit the data or signal stored in the storage device to the system controller 50 via an output bus 200. The readout operation can be performed serially and/or in parallel depending on the implementation. It can in addition be performed asynchronously or synchronously. The readout operation for a given pixel can be performed one or more times within a single integration time. In a preferred embodiment, the same pixel is read out many times within a single integration time so that the requirement on the storage device capacity can be eased, thus reducing the storage device size.

Figure 5:
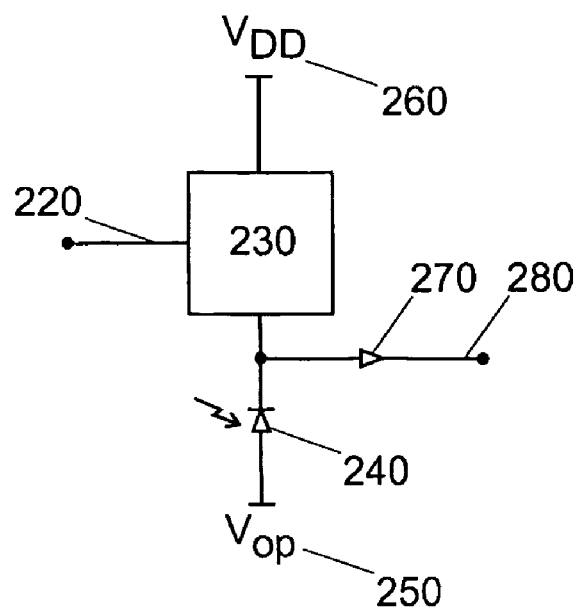
FIG. 5 illustrates an APD circuit operating in Geiger mode variant A.

FIG. 5 shows a configuration for the APD circuit whereby the APD signal stays compatible with the low voltage CMOS electronics. As already mentioned, when the APD, 240, is operating in Geiger mode, a quenching and recharge circuit 230 is required. The circuit 230 can optionally have an input 220 driven by 131 and/or 120 to stop the APD activity. The input 220 can be used, for instance, when the storage device 170 is full or the system is busy. When the avalanche photodiode 240 operates in linear mode, the circuit 230 becomes a reset circuit. In this configuration, the cathode of the avalanche photodiode 240 stays always below the circuit power supply voltage $V_{DD}$ 260. Its anode is connected to a negative voltage so that the APD bias voltage is close to its breakdown voltage (VBD) when it operates in linear mode or above VBD when operating in Geiger mode. The element 270 represents the first electronic stage within the APD circuit. It is used to convert the APD signal to a voltage pulse or to a current pulse. Its output 280 represents the output 140 of 110.

Figure 6:
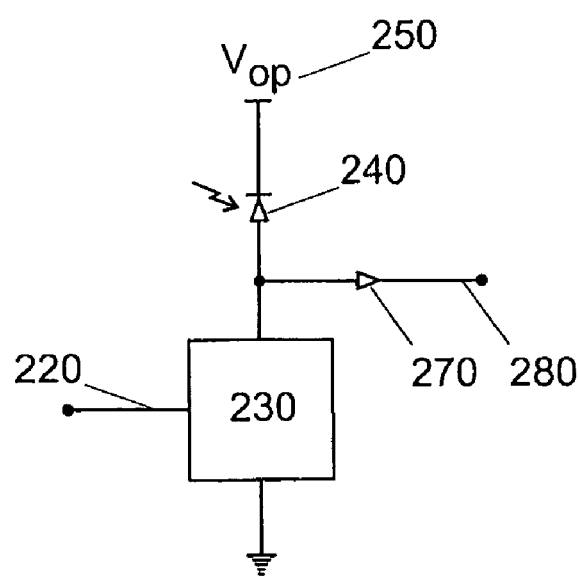
FIG. 6 illustrates an APD circuit operating in Geiger mode variant B.

FIG. 6 shows a second configuration for the APD circuit. In this configuration, the position of the avalanche photodiode 240 and of the reference 230 are exchanged. The advantage of this configuration is that no negative voltage is required and the APD signal can still be maintained below the voltage of the power supply. In addition, this configuration can help to decrease the APD parasitic capacitance when it is based on shallow p-type anode within an n-type well cathode.

Figure 7:
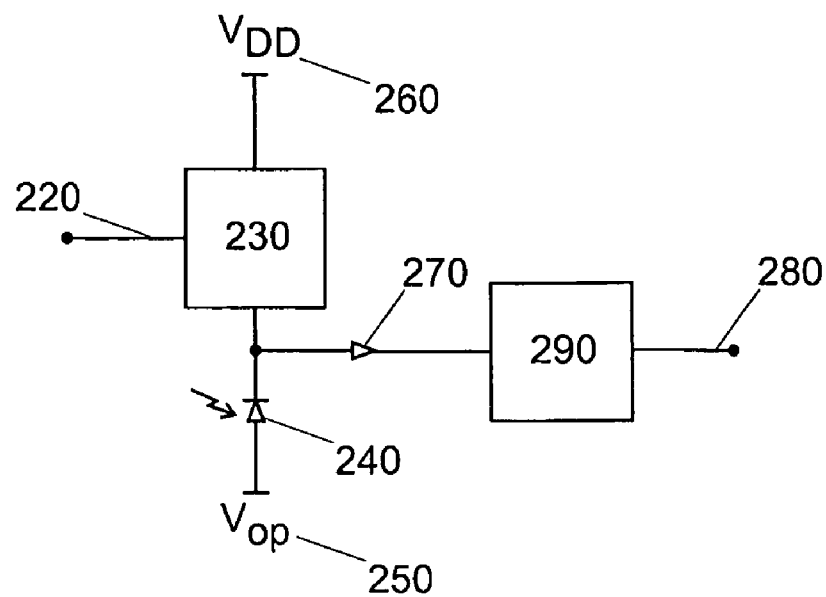
FIG. 7 illustrates an APD circuit operating in Geiger mode variant A with edge detection circuit.
Figure 8:
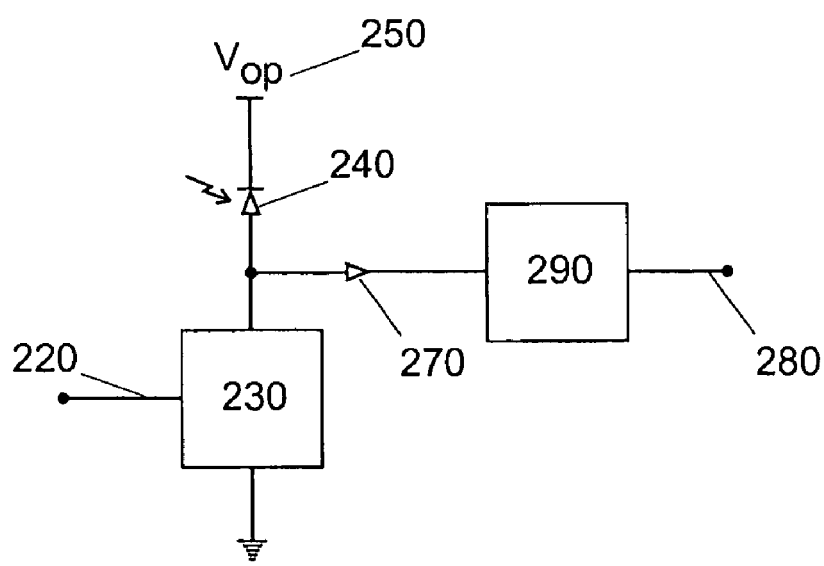
FIG. 8 illustrates an APD circuit operating in Geiger mode variant B with edge detection circuit.
Figure 9:
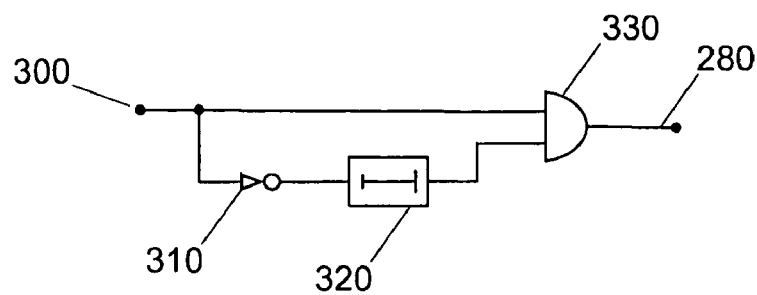
FIG. 9 illustrates a rising edge detection circuit.
Figure 9:
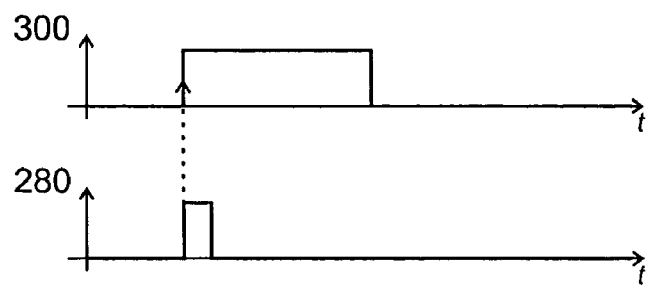
Figure 10:
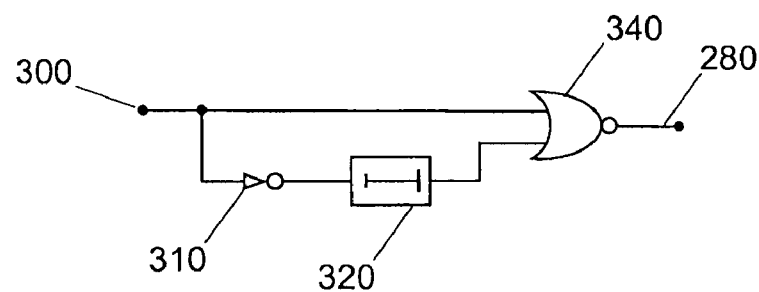
FIG. 10 illustrates a falling edge detection circuit.
Figure 10:
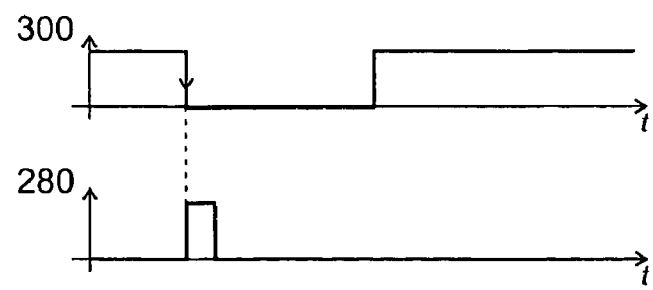

FIG. 7 and FIG. 8 depict respectively other embodiments of the circuits of FIG. 5 and FIG. 6 in which an additional element 290 (edge detection circuit) is added to reduce the voltage or current pulse duration. In order to minimize errors in the computation of the PHI, when a photon is detected within a fraction of period corresponding to a given Ci, it is important to prevent the signal pulse to extend to the next fraction of period. The function of the element 290 is to shorten the duration of the signal pulse so that it becomes very short as compared to TD, thus minimizing errors. FIG. 9 and FIG. 10 show two different implementations for the element 290 when the APD circuit signal is a digital voltage pulse. If the leading edge of the signal pulse is a rising edge, the circuit of FIG. 9 is used. This circuit consists of an input node 300, an inverter gate 310, a delay cell 320, a AND gate 330, and the APD circuit output signal 280. An example of waveform for the input node 300 and for the output signal 280 is shown in FIG. 9. If the leading edge of the signal pulse is a falling edge, the circuit of FIG. 10 can be used instead. In this circuit, the AND gate 330 is replaced by a NOR gate 340. An example of waveform for the signals 300 and 280 is also shown in FIG. 10.

Figure 11:
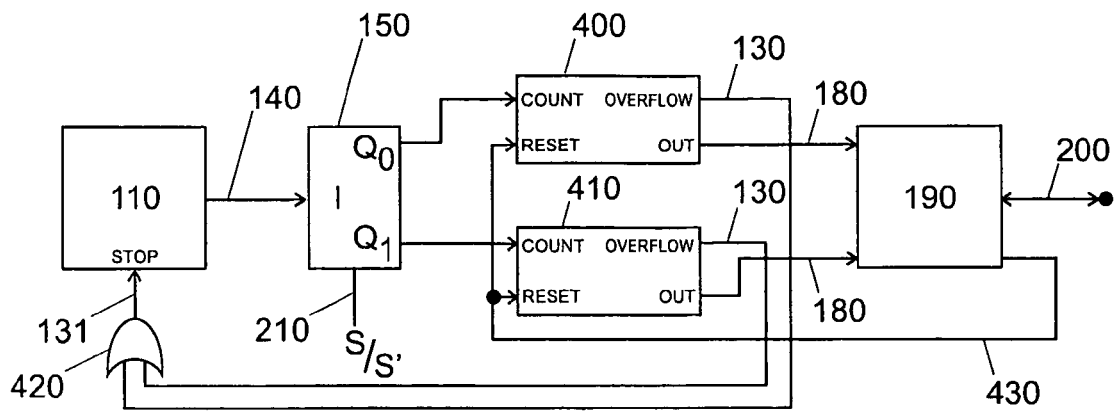
FIG. 11 illustrates a pixel circuitry according to the present invention.
Figure 14:
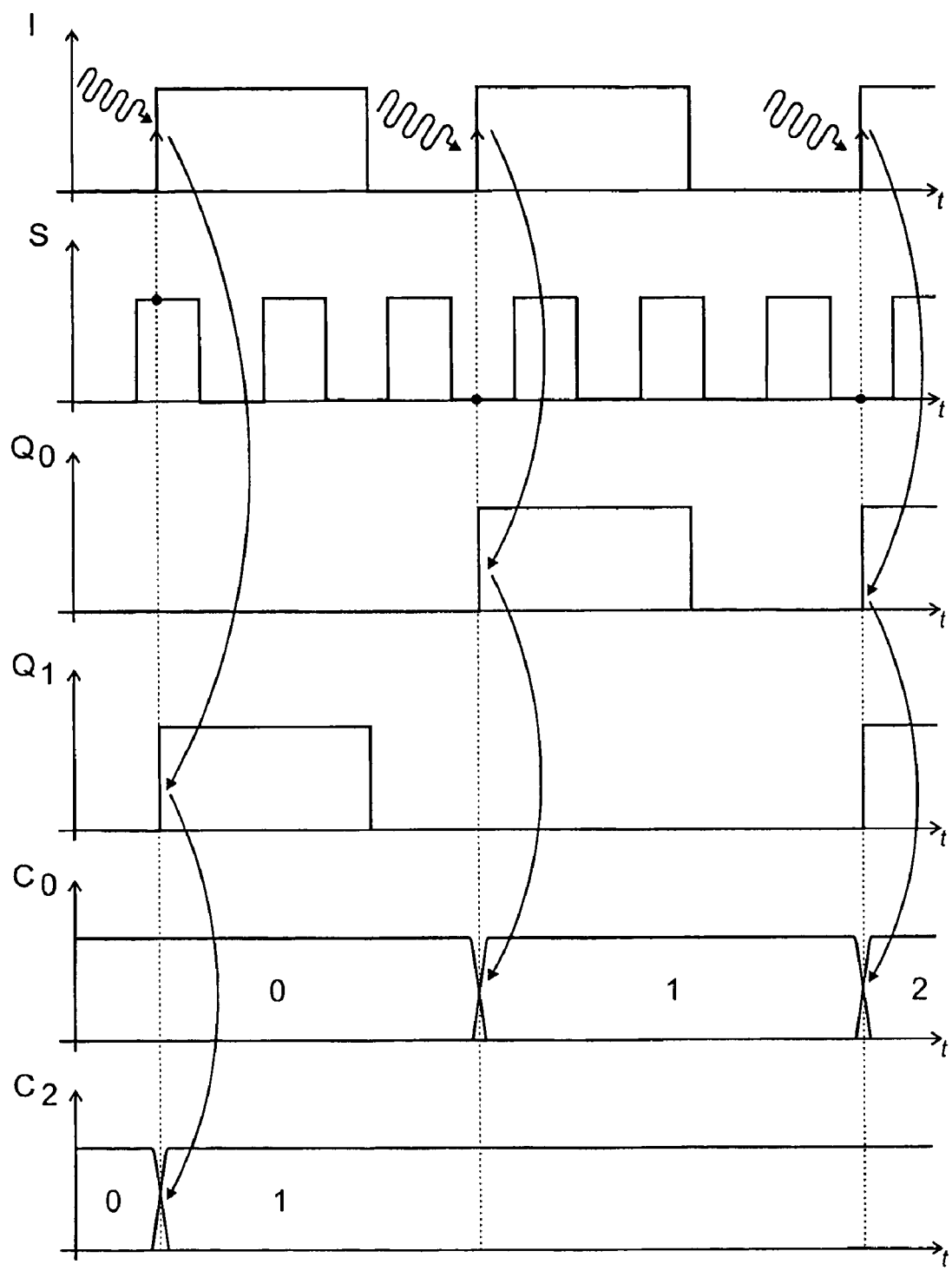

More generally, in order to detect the leading edge of a digital voltage pulse at the output of the avalanche photodiode, one connects one node of the avalanche photodiode to a comparator. Such comparator being for example an analogue comparator or a logic gate such as a digital inverter FIG. 11 shows a complete pixel circuit according to the present invention wherein reference 110 is for instance the circuit of FIG. 6 operating in Geiger mode. The multiplexer 150 has two channels. In addition, the multiplexer is designed in such way to hold its selection signal when the signal in 140 is active. This mechanism prevents the signal, a digital pulse in this particular case, from appearing on both outputs of the multiplexer ($Q_0$ and $Q_1$) if the selection signal 210 changes during the digital pulse duration. FIG. 14 shows an example of waveform of the signals of a multiplexer implementing such mechanism. As can be seen, at the moment of photon detection, depending on the state of the selection signal 210, either $Q_0$ or $Q_1$ reproduces the digital pulse triggered by the photon. The storage device 170 consists in this example of two digital counters 400 and 410. The counters are only sensitive to the leading edge of the digital pulse appearing on their input. In this configuration, only two different fractions of period $\{C_i\}$ are sampled and stored simultaneously. In order to compute all four $\{C_i\}$ where i can be 0, 1, 2 and 3, corresponding to each fraction of a period modulation cycle, the full integration time is divided in two halves, corresponding to two fractions of the integration time.

In a preferred embodiment, the period P of the optical wave has a duration of less than a few microseconds, preferably a duration of a few nanoseconds, for example 50 ns. The integration time has preferably a duration of at least a few microseconds, preferably at least a few milliseconds, possibly 33 ms.

Figure 12:
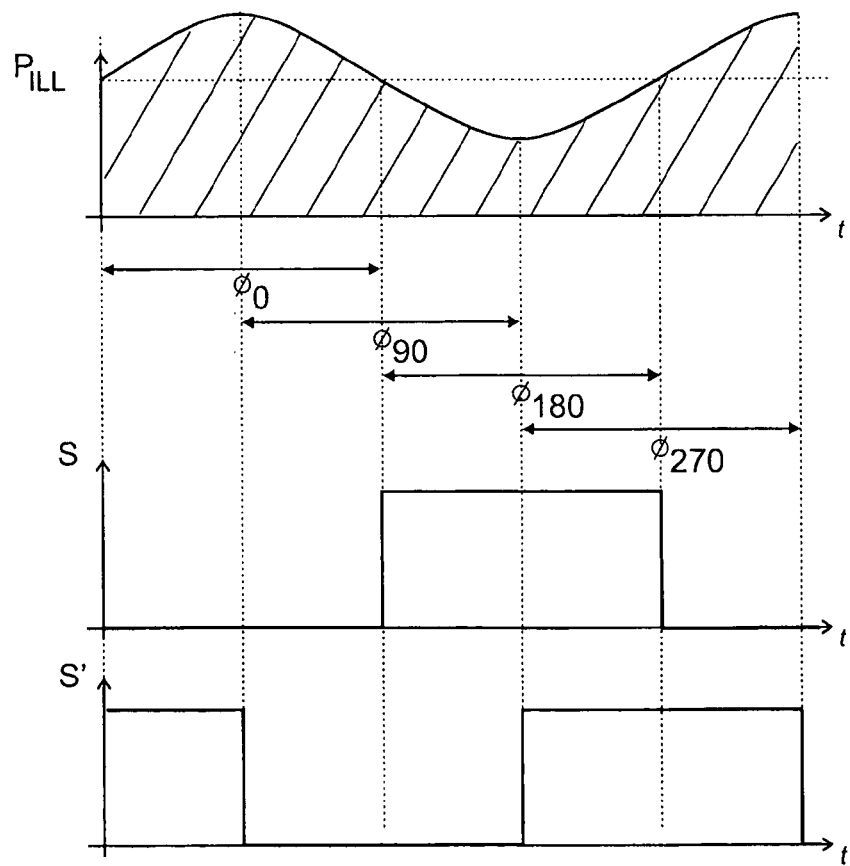
FIG. 12 illustrates a waveform for the S signal within the pixel circuitry with respect to the illumination modulation.

FIG. 12 presents an example of waveform for optical power of the modulated illumination system and the waveform of the corresponding selection signal 210 of the multiplexer. During the first half of the integration time (HIT), the selection signal is S and it operates at the illumination modulation frequency F. During this HIT, the fractions of period $C_0$ and $C_2$ corresponding to the phases $\phi_0$ and $\phi_{180}$ are stored. During the second HIT, the select signal 210 becomes S' and it has a phase shift of 90 degrees with respect to S of the previous HIT. During this HIT, the remaining fractions of period $C_1$ and $C_3$ corresponding to the phases $\phi_{90}$ and $\phi_{270}$ are stored. At the end of the integration time, all $\{Ci\}$ are available and are used for computing PHI, A, B and Z. The two counters can be read many times during each HIT through 190 so that their capacity can be very small to save area. In the example of FIG. 14, the evolution of $C_0$ and $C_2$ when photons are detected is also shown. One should notice that the figure illustrates the HIT during which the active selection signal 120 is S, thereby acquiring $C_0$ and $C_2$. A similar waveform can be obviously drawn for the HIT during which S' is active.

When the total capacity of one of the counters is reached, its overflow signal 130 is used through a logic gate 420 to stop the APD circuit or deactivate the multiplexer outputs until the end of the next readout phase. After the readout phase, the pixel readout circuit 190 resets both counters and the APD circuit starts operating normally. When the scene comprises moving objects, since not all the phases are acquired simultaneously due to the partition of the integration time into two fractions, image artifacts or distance errors can be generated. In order to reduce those errors, the integration time can be further divided into an even number of interlaced intervals larger than two. The method consists then in using all the odd intervals of the integration time to form the first fraction of integration time, i.e. the first HIT and all the even intervals to form the second fraction of integration time (second HIT). The total duration of all intervals is the integration time.

In an embodiment, a total integration time of, lets assume, 33 ms, is divided into 10 intervals of 3.3 ms each. During the five odd intervals (i.e. from 0 to 3.3 ms, from 6.6 ms to 9.9 ms and so on) the output of the multiplexer 150 is added into the counters $c_0/c_2$ depending on the fraction of the period. During the five even intervals (from 3.3 ms to 6.6 ms, from 9.9 ms to 13.2, etc), the output of the multiplexer 150 is added into the counters $c_1/c_3$ depending on the fraction of the period.

Figure 13:
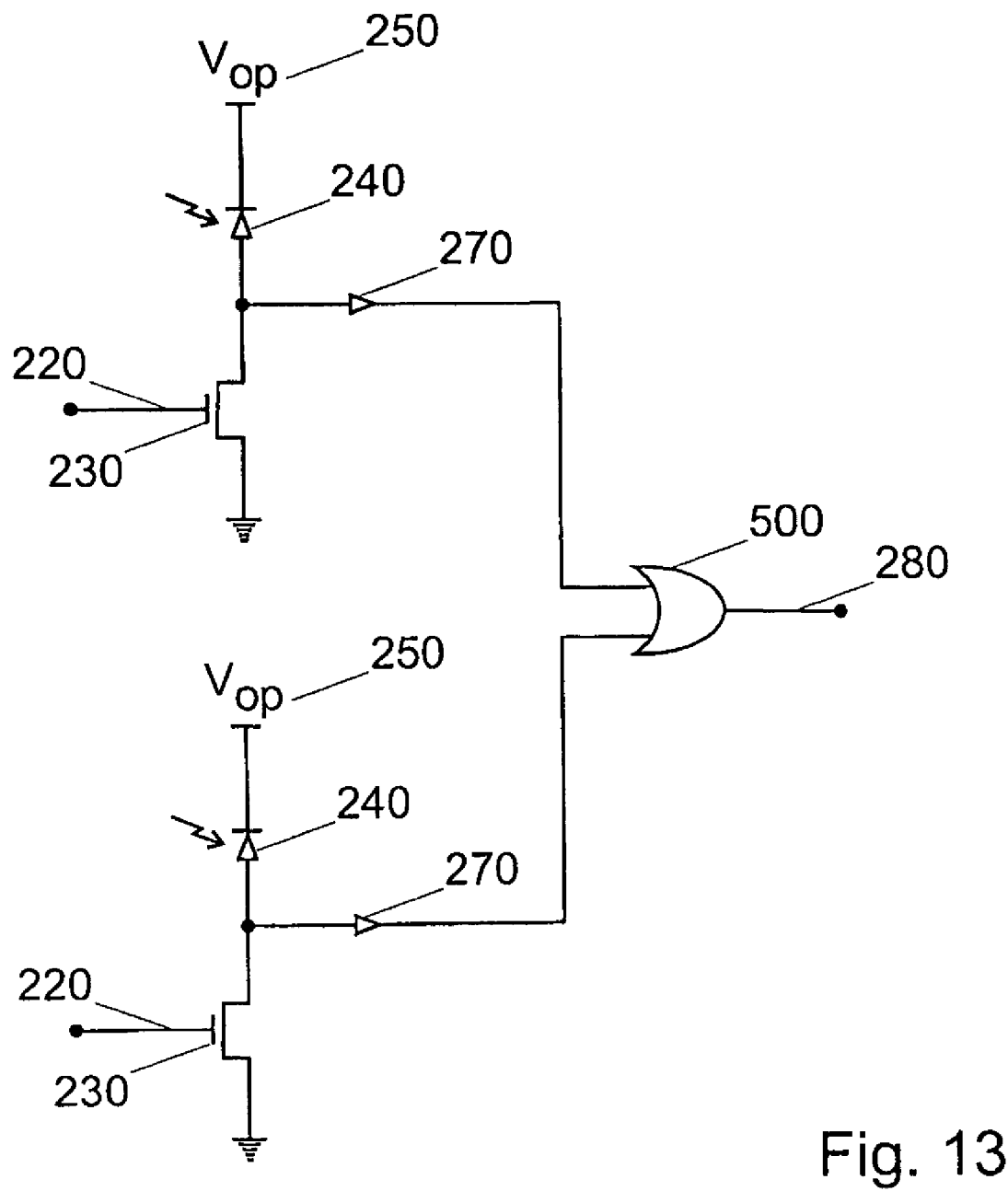
FIG. 13 illustrates a variant of APD circuit comprising multiple avalanche photodiodes operating in Geiger mode and
FIG. 14 illustrates a waveform of multiplexer signals for the half integration time during which S is active.

In order to improve light collection and to increase the dynamic range of the solid-state rangefinder, a single pixel can use more than a single avalanche photodiode APD. For instance, FIG. 13 depicts an APD circuit in which two APDs are used. Each APD 240 is connected to its own biasing circuit, in this example a quenching/recharge circuit 230, and its own first electronics stage 270. The output of their first stage electronics are combined together via a logic circuit 500 when the APDs are operating in Geiger mode, in this example an OR gate, or via an analogue current adder stage, e.g. a simple node, when they are operating in linear mode. Obviously, the number of APDs combined within a single pixel can be increased to more than two and that the logic circuit 500 can be any logic gate or any combination of them. An interesting aspect of this method is the fact that one or more combined APDs can be temporarily deactivated via their bias circuit 220 depending on the amount of signal the rangefinder receives. In the prior art, when one object is placed too close to rangefinders active illumination, their photodetectors tend to saturate due to large amount of light reflected, thus limiting the measurement accuracy. One trivial solution to this problem is to lower the sensitivity of the pixel's photodetector by changing its operating condition, e.g. its bias voltage, or reducing the time during which the pixel's photodetector is sensitive to light. According to the present invention, apart from the benefits of changing the operating condition or reducing the effective integration time of the pixel's APDs, one or more APDs can be completely turned off within an individual pixel, within a set of pixels or within all pixels, thus increasing the dynamic range in the high end. The same principle can be additionally used to reduce the effects of pixels that have higher noise and/or present defects. For instance, when a particular pixel composed of two APDs and one APD suffers too much from dark current in linear mode or dark counts in Geiger mode, or from high noise, or from any other defects, it can be switched off and the signal of the remaining APD(s) within the pixel could be adapted in the system level to compensate for the APD that is not operating properly. This method is especially interesting to increase the fabrication yield, by increasing the number of acceptable integrated circuits, when a standard and large scale IC fabrication process that is not optimized for image sensor is used.

Parts or the totality of the avalanche photodiodes can be switched off permanently, for example by programming some elements of the corresponding circuit or via laser trimming for instance. Alternatively, parts or the totality of the avalanche photodiodes can be switched off permanently or temporarily, for example with a single command, and/or by writing a value in a memory element such as, but to restricted to, a digital latch or a digital flip-flop associated with one or several pixels.

In a preferred embodiment, beside the main imaging lens 60, the photonic wave of interest can be additionally focused into the light sensitive area of the pixels, that is to say, into the centre of the avalanche photodiodes, by means of integrated optics such as microlenses. This technique, known in the art for conventional image sensors, is particularly advantageous so as to improve photon collection preventing said photonic wave to fall on the light insensitive area of the pixel and possibly to disturb components on those areas.

As mentioned, the proposed arrangement enables the detection, simultaneously or separately, of the intensity of the photonic wave. Said light intensity provides greyscale image of the target photonic wave. In an embodiment, usual colour filters such as, but not restricted to, Red, Green and Blue, or infrared filters, can be used to generate, simultaneously or separately, colour intensity images and/or distance map images.

In an embodiment, a small portion of the illumination power 30.1 is collected by means of an optic component and is used as a reference signal to modulate the input 210 of multiplexer 150. The collection of a portion of the illumination power can be done, but not restricted to, by means of a lens, an optical coupler, optic fibre or any combination of them. The use of such reference signal coming from the illumination power may be used for generating a compensation signal and for cancelling the effects of timing and/or amplitude shifts or timing jitter at the light source 20 due to external parameters such as temperature or any other environment factor. Said reference signal can be used in the form of photonic wave when multiplexer 150 is at least partially made of opto-electronic components such as, but not restricted to, phototransistors. Said reference signal can be alternatively converted to an electrical signal and used to modulate the input 150 of said multiplexer 150. This conversion can be achieved by means of any kind of photodetectors including avalanche photodiodes.

If several avalanche photodiodes are used for each pixel, they are preferably very close to each other on the sensor. In a preferred embodiment, the pixel is exposed to the received photonic wave via an imaging lens, and the APDs within a pixel are arranged such that their distance is smaller than half of the spatial resolution of the imaging lens.

In the above embodiments, the sensor is thus composed of an array of pixels, and each pixel is composed of at least one avalanche photodiode and one circuit for processing signals output by the avalanche photodiode. The avalanche photodiodes and the corresponding circuit are both arranged in matrix form on a monolithic substrate, preferably on a single CMOS sensor.

It may however be possible to share one circuit, or some elements of the circuit, by several avalanche photodiodes. For example, one can use a single multiplexer, a single set of storage devices and/or a single read-out circuit for several avalanche photodiodes in a sub-array, or for all avalanche photodiodes in a row and/or in a column. It may also be possible to deport the circuits for processing signals output by the APD, or some elements of the circuits, outside the array of avalanche photodiodes, and/or to access the avalanche photodiodes and/or elements of the corresponding circuit in a scanned mode, by successively scanning rows and/or columns of the array.

The invention relates to solid-state sensors comprising zero, one or two dimensional array of avalanche photodiodes, i.e. also to arrays comprising a single row of pixel, single column, single pixel, up to arrays with hundreds or even thousands of rows and columns of pixels.

The frequency used for the modulation of the photonic source may be constant or predefined, or changed at any time. It may be possible for example to select a higher frequency when a high resolution is required, and a lower frequency when a lower resolution is sufficient, or when it is possible to perform a better interpolation within a period of the signal. In an embodiment, the frequency is changed or swept between several measures of a single scene. In this case, the high frequency may be used in order to benefit from the highest possible resolution, whereas a lower frequency will be used for phase unwrapping and to prevent the $2\pi$-phase ambiguity.

In the context of a multi-camera environment, that is to say, when a number of replicas of one proposed arrangement are for example located in such way their photonic signals interact with each other, the performance of each arrangement can be deteriorated due to optical interference. Similar interference problems are known and have been consequently addressed in other fields of the art, especially in radio-frequency and optical data communication. Existing techniques used to attenuate or cancel the effects of this interference include e.g. space division multiple access (SDMA), time division multiple access (TDMA), wavelength division multiple access (WDMA), frequency division multiple access (FDMA), and code division multiple access (CDMA). Any of these techniques can be used in accordance with the proposed invention without changing the scheme illustrated in FIG. 2.

In SDMA, each apparatus is located in such way their photonic signals do not interact with each other, thereby preventing any interference effect. Even thought this technique is simple and effective, in some applications, especially when at least one of the proposed arrangements is moving, such spatial separation cannot be guaranteed. In such cases, more sophisticated techniques such as TDMA, WDMA, FDMA, or CDMA ought to be used.

TDMA is performed by assigning a timeslot for each arrangement of the system during which only one arrangement actively generates its photonic illumination, the remaining arrangements in the multi-camera environment being in inactive state or performing tasks with non-use of photonic illumination. TDMA requires that all the apparatuses in the environment work synchronously and possibly having a master arrangement that controls the timeslots and synchronization. In addition, since TDMA restricts the amount of effective time an arrangement operates; it reduces the measurement rate and/or reduces the performance of each apparatus.

In WDMA, each arrangement in the environment emits photonic waves with a unique wavelength. In addition, such wavelength is sufficiently spaced in the electromagnetic spectrum from any wavelength assigned to any other apparatus in the environment. By proper use of optical filters, chosen accordingly to assigned wavelengths, one can prevent the photonic wave of a given arrangement to reach the photosensitive area of a neighbour arrangement, thus preventing interference. For example, an arrangement, namely A700, could be equipped with a light source emitting at 700 nm and all the remaining arrangements could be equipped with light sources emitting at wavelengths below 675 nm or above 725 nm. In this case, an optical band-pass filter, such as interference optical filters, centred at 700 nm and with a bandwidth smaller than 50 nm could be used with arrangement A700 preventing the photonic waves of the remaining arrangements to reach its photosensitive area.

In FDMA, the total range of photonic modulation bandwidth is divided into a number of discrete frequencies. Each frequency is assigned to each individual arrangement in the multi-camera context and it is used to modulate said selection input 210 of multiplexer 150 as well as light source 20. As a result of the detection of a large number of modulation periods by each arrangement, the external photonic wave corresponding to a different frequency is averaged and contributes uniformly into all the accumulated values $\{Ci\}$. Consequently, the external photonic waves corresponding to different frequencies do not contribute to the phase measurement at the assigned frequency. This averaging effect is particular effective when the number of modulation periods, and consequently the integration time, is increased. The assignment of discrete frequencies to each arrangement may be achieved by many different means. For example, each arrangement could have a permanent and unique frequency or a temporary frequency assigned in real time depending on the availability of non-used frequencies at a given multiple-camera context. The assignment and modification of frequencies can be achieved extremely fast, especially when proposed arrangement is mounted on a moving vehicle and can randomly interact to a number of different similar arrangements or different sources of modulated photonic waves. In particular, real time measurement of the phase PHI, amplitude A, and/or the offset B may be used to evaluate frequency slots availability by, for example, deterministically or randomly scanning a number of possible frequencies. Other communication means available between different arrangements such as, but not restricted to, wired electrical signal, infrared and/or radio-frequency can also be used in the process of frequency selection and distribution. Another implementation of FDMA would be the use of frequency sweep, either deterministic or random. For example, each arrangement can use a different frequency during sub-intervals of the total integration time. The use of a pseudo-random sequence of frequencies by each arrangement would for example restrain other arrangements to operate at the same frequency over an extend amount of time. Continuous frequency sweeping modulation is also known in the art as chirp modulation. The actual implementation of FDMA can require frequency synthesizer circuits that can be monolithically implemented on the same integrated circuit as the proposed arrangement. Examples of frequency synthesizer known in the art are phase locked loops and delay locked loops.

CDMA implies the use of modulation waveforms that are orthogonal with respect to the demodulation process. Each arrangement operating in the multiple-camera context uses an individual waveform, or simply a code, in such way that, during the process of demodulation, parasitic photonic signals emitted from other arrangements do not interfere with the phase measurement. This characteristic is obtained by the orthogonality property of selected waveforms. These waveforms can be used in the proposed arrangement to modulate said selection input 210 of multiplexer 150 as well as light source 20. An example of modulation waveform based on CDMA that is applicable to the present invention is pseudo noise optical modulation. Pseudo random sequences can be effectively generated by a number of analogue or digital circuits know in the art, suitable to be monolithically integrated with the proposed arrangement. An example of such circuits is the linear feedback shift register circuit. Another advantageous property of proposed invention is the possible use of digital waveforms, or codes, to modulate said selection input 210 of multiplexer 150 as well as light source 20. Other analogue or digital modulations schemes based on orthogonal waveforms and/or on modifications of the modulation frequency may be used.

Other existing methods known in the art to reduce the effect of photonic interference between arrangements in the multiple-camera context and/or between one arrangement and the ambient or background light can be obviously applied. For example, low-pass, high-pass, band-pass, and/or band-stop optical filters can be effectively used, as previously mentioned, specially when said light source 20 present fixed spectral properties such as central wavelength. Another example of optical components suitable to help reducing parasitic interference is polariser filters. In particular, a polarised photonic wave could be filtered by a polariser placed in front of the arrays of pixels so as to prevent its direct exposure. This mechanism can be used to reduce the exposure of pixels to non-reflected photonic waves. Photonic waves reflected by objects in the scene present polarization deviations that can be effectively exploited to reduce interference, especially when multiples arrangements face each other in a multiple-camera environment.

The described arrangement can also be used within the frame of the invention for other purposes than measuring the distance of an object, for example for measuring its speed or acceleration, or also for determining the lifespan of a fluorophore attached to a given molecule under investigation by means of the phase of a photonic wave received by the avalanche photodiode. In this later case, the lifespan can be recorded independently and in parallel for all pixels in a lifetime imaging experiment. The fluorophore and/or surrounding molecules can be identified and/or analyzed on filterless experiments such as a lab-on-chip or on microscopy based experiments such as FLIM.

More generally, the described arrangement can be used in any application or experiment involving the measurement of the phase and/or amplitude of a photonic wave. Examples of such applications can be found in the art and, in particular, in utility patent U.S. Pat. No. 6,825,455.

The invention claimed is:

1. A distance measuring arrangement for measuring the distance to an object, comprising:
    a photonic source for illuminating said object using a continuous modulated photonic wave, and
    a solid-state image sensor, comprising an array with W×H avalanche photodiodes with W≧1 and H≧1 and a circuit for processing signals output by said avalanche photodiodes to output distance data depending on a phase of the photonic wave reflected by said object onto said photodiodes, wherein said solid-state image sensor comprises one said circuit for each avalanche photodiode, and wherein said avalanche photodiodes are reverse biased above their breakdown voltage, thus operating in Geiger mode.

2. The arrangement of claim 1, wherein the continuous modulated photonic wave is free from discontinuities.

3. The arrangement of claim 1, said sensor comprising at least one said circuit for processing signals output by a plurality of avalanche photodiodes.

4. The arrangement of claim 1, wherein said photonic wave is periodically modulated, and wherein said circuit outputs data proportional to the phase and/or amplitude of said reflected photonic wave.

5. The arrangement of claim 1, wherein said solid-state image sensor is fabricated on a monolithic integrated CMOS circuit chip.

6. The arrangement of claim 1, wherein said circuit comprises at least one multiplexer, one or more storage devices, and a readout circuit,
    wherein each independent multiplexer output is connected to an independent storage device,
    wherein at least one selection input of said multiplexer is periodically modulated so as to accumulate into said storage devices the signal output by at least one connected avalanche photodiode during a given period of time defined as the integration time.

7. The arrangement of claim 6, wherein each storage device comprises at least one counter, and wherein each counter is connected to readout circuit allowing the contents of each counter to be read simultaneously and/or consecutively synchronously to an global clock signal or asynchronously via a read request signal.

8. The arrangement of claim 7, wherein the content of said counter is read and reset many times during each integration time so that the capacity of said counter can be reduced.

9. The arrangement of claim 7, wherein the output of said avalanche photodiode circuit and/or the outputs of said multiplexer are held to an inactive state as soon as the full capacity of one of said counters is reached, using an overflow signal provided by each counter.

10. The arrangement of claim 7, wherein said multiplexer holds its state when the avalanche photodiode circuit output is active so that only the counter connected to the multiplexer output that was selected during the photo detection is incremented on the leading edge of said digital pulse.

11. The arrangement of claim 1, said solid-state image sensor comprising an array of pixels, each pixel comprising:
    (a) one of said avalanche photodiodes;
    (b) one multiplexer with one common input, one selection input, and at least two outputs;
    (c) at least two digital counters with an overflow output signal; and
    (d) a readout circuit that allows the contents of said at least two counters to be read and reset.

12. The arrangement of claim 1, said solid-state image sensor comprising an array of pixels and means for combining the signals of two or more avalanche photodiodes within a pixel to increase the sensitivity of the pixel to the photonic wave.

13. The arrangement of claim 1, comprising a plurality of integrated focusing elements for focusing light into the light sensitive part of each photodiode.

14. The arrangement of claim 1, comprising a plurality of colour filters with different colours to generate colour intensity images.

15. The arrangement of claim 1, comprising a circuit for compensating the effects of timing and/or amplitude shifts or timing jitter depending on the signal output by at least one reference photodiode.

16. The arrangement of claim 1, comprising a circuit for changing the modulation frequency used for modulating said photonic wave.

17. An arrangement for measuring the distance to an object, comprising:
a photonic source for illuminating said object using a continuous modulated photonic wave, and
a solid-state image sensor, comprising an array with W×H avalanche photodiodes with W≧1 and H≧1 and a circuit for processing signals output by said avalanche photodiodes to yield data depending on the phase and/or amplitude of the continuous photonic wave reflected by said object onto said photodiodes,
wherein said circuit comprises at least one multiplexer, one or more storage devices, and a readout circuit,
wherein each independent multiplexer output is connected to an independent storage device,
wherein at least one selection input of said multiplexer is periodically modulated so as to accumulate into said storage devices the signal output by at least one connected avalanche photodiode during a given period of time defined as the integration time,
wherein each storage device comprises at least one counter, and wherein each counter is connected to readout circuit allowing the contents of each counter to be read simultaneously and/or consecutively synchronously to an global clock signal or asynchronously via a read request signal,
wherein said multiplexer holds its state when the avalanche photodiode circuit output is active so that only the counter connected to the multiplexer output that was selected during the photo detection is incremented on the leading edge of said digital pulse,
wherein each periodically modulated selection input of said multiplexer is connected through a digital latch, the clock signal of said latch is synchronized with the digital signal of the avalanche photodiode circuit so that when the digital pulse is at its active level, the latch is blocked and so is each multiplexer selection input.

18. A distance measuring method for measuring the distance to an object, comprising the steps of:
illuminating said object with a continuous modulated photonic wave,
determining said distance from signals delivered at the outputs of avalanche photodiodes arranged in an array on a solid-state sensor, using a circuit for processing signals output by said avalanche photodiodes, wherein one said circuit is provided for each avalanche photodiode;
wherein said distance is determined from the phase of the photonic wave reflected onto said photodiode, and wherein said avalanche photodiodes are reverse biased above their breakdown voltage, thus operating in Geiger mode.

19. The method of claim 18, wherein said photonic wave is periodically modulated.

20. The method of claim 18, comprising a step of operating a plurality of avalanche photodiodes in Geiger mode on a monolithic integrated CMOS solid-state sensor.

21. The method of claim 18, comprising the steps of:
illuminating said object with a periodic photonic wave having a period (P); counting pulses generated by said avalanche photodiodes during each of a plurality of fractions of said period (P),
determining said distance from the amounts of counted pulses during each of said fractions of said period.

22. The method of claim 21, comprising a step of multiplexing the output of said avalanche photodiode so as to connect the output of said avalanche photodiode with different storage devices during said different fractions of said period.

23. The method of claim 22, comprising the steps of:
(a) choosing a total integration time longer than said period,
(b) dividing said total integration time into a plurality of fractions of the integration time;
(c) commanding a selection input of a multiplexer with selection signals having different phases during said fractions of the integration time,
(d) during each fraction of the integration time, separately accumulating the number of pulses generated over a plurality of periods by said avalanche photodiodes during each fraction of period.

24. The method of claim 23, wherein said integration time is divided into an even number of intervals of the integration time larger than two, the method comprising using all the odd intervals of the integration time to form a first fraction of the integration time and all the even intervals to form a second fraction of the integration time.

25. A distance measuring circuit comprising:
an integrated array of W×H avalanche photodiodes with W≧1 and H≧1
a circuit connected to said array for determining a distance depending on the phase of a continuous photonic wave received by each photodiodes, wherein one said circuit for each avalanche photodiode is provided.

26. A distance measuring apparatus, comprising:
a photonic source for illuminating said object using a continuous modulated photonic wave,
a monolithic integrated CMOS circuit having an array of W×H avalanche photodiodes operating in Geiger mode, with W>1 and H>1,
a circuit connected to said array, said circuit having a counter connected to the output of the avalanche photodiodes and arranged for counting a value corresponding to the number of photons received by said counter during a duration, and
processing means for determining a distance based on said value.

27. A distance measuring arrangement for measuring the distance to an object, comprising:
a photonic source for illuminating said object using a continuous modulated photonic wave, and
a solid-state image sensor comprising an array with W×H avalanche photodiodes with W≧1 and H≧1 and a circuit for processing signals output by said avalanche photodiodes to output distance data depending on a phase of the photonic wave reflected by said object onto said photodiodes,
wherein, said solid-state image sensor is fabricated on a monolithic integrated CMOS circuit chip, and wherein said avalanche photodiodes are reverse biased above their break down voltage to operate in Geiger mode.

28. A distance measuring arrangement for measuring the distance to an object, comprising:

a photonic source for illuminating said object using a continuous modulated photonic wave, and a solid-state image sensor comprising an array with W×H avalanche photodiodes with W≧1 and H≧1 and a circuit for processing signals output by said avalanche photodiodes to output distance data depending on a phase of the photonic wave reflected by said object onto said photodiodes, wherein said circuit comprises at least one multiplexer, one or more storage devices, and a readout circuit, wherein each multiplexer has an output which is connected to an independent one of said one or more storage devices, wherein said multiplexer has at least one input which is periodically modulated so as to accumulate into said one or more storage devices a signal output by at least one connected avalanche photodiode during a given period of time defined as an integration time.

29. A distance measuring method for measuring the distance to an object, comprising the steps of:

illuminating said object with a continuous modulated photonic wave;

operating a plurality of avalanche photodiodes in Geiger mode on a monolithic integrated CMOS solid-state sensor;

determining said distance from signals delivered at the outputs of avalanche photodiodes arranged in an array on a solid-state sensor;

wherein said distance is determined from a phase of the photonic wave reflected onto said photodiodes.

30. A distance measuring method for measuring the distance to an object, comprising the steps of:

illuminating said object with a continuous modulated photonic wave, providing at least one multiplexer, one or more storage devices, and a readout circuit, wherein each independent multiplexer has an output connected to an independent storage device, wherein said multiplexer has at least one selection input periodically modulated so as to accumulate into said storage devices the signal output by at least one connected avalanche photodiode during a given period of time defined as an integration time;

determining said distance from signals delivered at the outputs of avalanche photodiodes arranged in an array on a solid-state sensor, wherein said distance is determined from a phase of the photonic wave reflected onto said photodiodes.

31. A method for measuring the distance to an object, comprising the steps of:

illuminating said object with a continuous modulated photonic wave, wherein the continuous modulated photonic wave is a periodic photonic wave having a period (P);

determining said distance from signals delivered at outputs of avalanche photodiodes arranged in an array on a solid-state sensor, wherein said distance is determined from a phase of the photonic wave reflected onto said photodiode;

counting pulses generated by said avalanche photodiodes during each of a plurality of fractions of said period (P);

determining said distance from the counted pulses during each of said fractions of said period;

multiplexing outputs of said avalanche photodiodes so as to connect the outputs of said avalanche photodiodes with different storage devices during said different fractions of said period;

choosing a total integration time longer than said period;

dividing said total integration time into a plurality of fractions of the integration time;

commanding a selection input of a multiplexer with selection signals having different phases during said fractions of the integration time;

during each fraction of the integration time, separately accumulating the number of pulses generated over a plurality of periods by said avalanche photodiodes during each fraction of period, wherein said integration time is divided into an even number of intervals of the integration time larger than two, the method comprising using all odd intervals of the integration time to form a first fraction of the integration time and all even intervals to form a second fraction of the integration time.

32. A distance measuring circuit, comprising:

an integrated array with W×H avalanche photodiodes with W≧1 and H≧1, and a circuit connected to said array for determining a distance depending on a phase of a continuous photonic wave received by each photodiodes, wherein said circuit is fabricated on a monolithic integrated CMOS circuit chip, and wherein said avalanche photodiodes are reverse biased above their break down voltage to operate in Geiger mode.

33. A distance measuring circuit, comprising:

an integrated array with W×H avalanche photodiodes with W≧1 and H≧1, and a circuit connected to said array for determining a distance depending on a phase of a continuous photonic wave received by each photodiodes, wherein said circuit comprises at least one multiplexer, one or more storage devices, and a readout circuit, wherein each independent multiplexer has an output which is connected to an independent storage device, wherein at least one selection input of said multiplexer is periodically modulated so as to accumulate into said storage devices the signal output by at least one connected avalanche photodiode during a given period of time defined as the integration time.

34. An arrangement for measuring the distance to an object, comprising:

a photonic source for illuminating said object using a continuous modulated photonic wave, and a solid-state image sensor, comprising an array with W×H avalanche photodiodes with W≧1 and H≧1 and a circuit for processing signals output by said avalanche photodiodes to yield data depending on the phase and/or amplitude of the continuous photonic wave reflected by said object onto said photodiodes, said solid-state image sensor comprising an array of pixels and means for combining the signals of two or more avalanche photodiodes within a pixel to increase the sensitivity of the pixel to the photonic wave, wherein each pixel comprises a plurality of avalanche photodiode and a plurality of storage devices, different avalanche photodiodes and/or different storage devices of one pixel being periodically activated and deactivated at different instants of one cycle of said photonic wave.

35. The arrangement of claim 34, wherein each pixel comprises:
(a) two avalanche photodiodes;
(b) two digital counters; and
(c) one readout circuit, wherein each counter is connected to one avalanche photodiode,
wherein said avalanche photodiode outputs and/or digital counters inputs are periodically activated and deactivated in synchronization with said photonic wave via a logic gate,
wherein when one counter is activated, the other counter is deactivated.

* * * * *